(12) United States Patent
Byun et al.

(10) Patent No.: US 10,887,901 B2
(45) Date of Patent: Jan. 5, 2021

(54) METHOD AND APPARATUS FOR TRANSMITTING UPLINK DATA IN WIRELESS COMMUNICATION SYSTEM

(71) Applicant: LG Electronics Inc., Seoul (KR)

(72) Inventors: Ilmu Byun, Seoul (KR); Heejeong Cho, Seoul (KR); Genebeck Hahn, Seoul (KR); Jiwon Kang, Seoul (KR); Heejin Kim, Seoul (KR); Hyunjin Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 165 days.

(21) Appl. No.: 16/090,509

(22) PCT Filed: Mar. 23, 2017

(86) PCT No.: PCT/KR2017/003101
§ 371 (c)(1),
(2) Date: Oct. 1, 2018

(87) PCT Pub. No.: WO2017/171301
PCT Pub. Date: Oct. 5, 2017

(65) Prior Publication Data
US 2019/0116610 A1 Apr. 18, 2019

Related U.S. Application Data

(60) Provisional application No. 62/316,600, filed on Apr. 1, 2016.

(51) Int. Cl.
*H04W 4/00* (2018.01)
*H04W 72/12* (2009.01)
(Continued)

(52) U.S. Cl.
CPC ....... *H04W 72/1268* (2013.01); *H04L 5/0037* (2013.01); *H04L 27/2607* (2013.01);
(Continued)

(58) Field of Classification Search
None
See application file for complete search history.

(56) References Cited

U.S. PATENT DOCUMENTS

| | | | |
|---|---|---|---|
| 2010/0080307 A1 | 4/2010 | Lee et al. | |
| 2012/0051445 A1* | 3/2012 | Frank | H04L 27/2607 375/259 |

(Continued)

FOREIGN PATENT DOCUMENTS

| | | |
|---|---|---|
| KR | 1020150129061 | 11/2015 |
| WO | WO2010064968 | 6/2010 |
| WO | WO2016029958 | 3/2016 |

OTHER PUBLICATIONS

International Search Report in International Application No. PCT/KR2017003101, dated May 24 2017, 6 pages.

*Primary Examiner* — Zewdu A Beyen
(74) *Attorney, Agent, or Firm* — Fish & Richardson P.C.

(57) ABSTRACT

Provided are a method and an apparatus for transmitting uplink data in a wireless communication system. Specifically, a first terminal transmits a random access preamble for requesting a connectionless transmission. The first terminal receives a random access response comprising scheduling information of the uplink data. The first terminal transmits uplink data and a reference signal from a first resource configured on the basis of scheduling information of the uplink data and information indicating the CP length of the reference signal. The CP length of the reference signal can be configured to be identical to the CP length of the random access preamble. The first resource can correspond to a resource utilized by both the first terminal and second terminal.

12 Claims, 13 Drawing Sheets

(51) Int. Cl.
*H04L 27/26* (2006.01)
*H04L 5/00* (2006.01)
*H04W 74/08* (2009.01)

(52) U.S. Cl.
CPC ...... *H04L 27/2613* (2013.01); *H04L 27/2646* (2013.01); *H04W 72/1289* (2013.01); *H04W 74/085* (2013.01); *H04W 74/0833* (2013.01)

(56) References Cited

U.S. PATENT DOCUMENTS

| | | | |
|---|---|---|---|
| 2013/0301611 A1* | 11/2013 | Baghel | H04W 74/0833 370/331 |
| 2013/0336268 A1* | 12/2013 | Better | H04W 56/0005 370/329 |
| 2015/0305067 A1 | 10/2015 | Noh et al. | |

* cited by examiner

METHOD AND APPARATUS FOR TRANSMITTING UPLINK DATA IN WIRELESS COMMUNICATION SYSTEM

CROSS-REFERENCE TO RELATED APPLICATIONS

This application is a National Stage application under 35 U.S.C. § 371 of International Application No. PCT/KR2017/003101, filed on Mar. 23, 2017, which claims the benefit of U.S. Provisional Application No. 62/316,600, filed on Apr. 1, 2016. The disclosures of the prior applications are incorporated by reference in their entirety.

BACKGROUND OF THE INVENTION

Field of the Invention

The present invention relates to wireless communication and, more particularly, to a method for transmitting uplink data in a wireless communication system and an apparatus using the same.

Related Art

A wireless communication system is widely deployed to provide various types of communication services, such as voice and data. An object of a wireless communication system is to enable a plurality of UEs to perform reliable communication regardless of their locations and mobility.

In general, a wireless communication system is a multiple access system capable of supporting communication with a plurality of UEs by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a 3GPP LTE system, a UE in an idle state needs to establish an RRC connection and a data connection before performing data transmission. That is, both a logical connection (RRC connection) between a BS and a UE and a logical connection (S1 connection/interface, EPS connection) between a mobility management entity (MME) and a UE need to be established. For a UE to perform data transmission, time necessary to establish these connections are further taken. However, it is inefficient to establish a connection when a UE transmits or receives a small amount of data once or twice. Therefore, a connectionless transmission scheme may be considered to solve this problem.

SUMMARY OF THE INVENTION

The present invention provides a method and an apparatus for transmitting uplink data in a wireless communication system.

The present invention proposes a method for transmitting uplink data on the basis of a connectionless transmission procedure in a wireless communication system.

Defining terms first, a connectionless transmission procedure may correspond to a procedure in which a user equipment (UE) transmits data to a base station (BS) in a state where a connection between the UE and the BS is not established. The state where the connection between the UE and the BS is not established may correspond to an RRC-unconnected state, an idle state, or an inactive state. A symbol described below may correspond to an OFDM symbol.

First, a first UE transmits a random access preamble for requesting connectionless transmission to a BS. Here, it is assumed that the first UE and a second UE transmit a random access preamble to the BS via the same resource to perform a connectionless transmission procedure. When the same resource is a second resource, the first UE and the second UE transmit the random access preamble via the second resource. That is, the second resource may correspond to a resource used overlappingly by the first UE and the second UE to transmit the random access preamble. Also, the random access preamble may correspond to message 1 in a random access procedure.

The first UE receives a random access response including scheduling information on uplink data and information indicating the CP length of a reference signal for the uplink data from the BS. The information indicating the CP length of the reference signal may explicitly indicates the CP length or may indirectly indicate the CP length by reporting that a resource with a long CP length is scheduled for uplink transmission. The second UE also transmits the random access preamble and thus may also receive the same random access response including the scheduling information on the uplink data from the BS. The random access response may correspond to message 2 in the random access procedure. Here, the reference signal may correspond to a reference signal for uplink channel estimation.

When a UE requests a resource for connectionless transmission, if it is agreed in advance to apply a reference signal with a long CP length to a corresponding uplink scheduling resource, information indicating the CP length of a reference signal may be omitted.

In addition, the random access response further includes one piece of time advance (TA) information for the first UE and the second UE. When one piece of TA information is transmitted, one UE may be synchronized in time, but another UE is not synchronized in time. Here, it is assumed that, through the piece of TA information, the first UE is not synchronized in time and the second UE is synchronized in time.

The first UE transmits the uplink data and the reference signal via a first resource set based on the scheduling information on the uplink data and the information indicating the CP length of the reference signal. Since the first UE and the second UE receive the same scheduling information on the uplink data from the BS, the first UE and the second UE transmit uplink data via the first resource. However, each UE arbitrarily selects a reference signal for contention resolution. Here, the uplink data and the reference signal may be included in message 3 in the random access procedure.

Here, the first resource may correspond to a resource used overlappingly by the first UE and the second UE. The present invention proposes designing a resource for message 3 that is robust against uplink asynchronization so that connectionless transmission can be applied to different UEs transmitting message 3. Therefore, a method for setting or configuring the first resource is important, which will be described below.

The CP length of the reference signal in the first resource is set to be equal to the CP length of the random access preamble, which means that the CP length of the reference signal is set to be longer than a normal uplink data transmission channel. Accordingly, an uplink synchronization difference may be smaller than the CP length of the reference signal, thus maintaining orthogonality between the reference signals, and the BS can easily estimate channels for different UE.

In the first resource, a guard interval may be set after a symbol for transmitting the reference signal. The length of the guard interval may be set to be equal to the length of a guard interval of the random access preamble. The symbol for transmitting the reference signal may be repeatedly disposed after the CP of the reference signal. That is, the symbol for transmitting the reference signal may be repeatedly disposed so that the maximum bandwidth available for transmission of message 3 is not reduced.

According to the structure of the first resource, orthogonality between the reference signals may be maintained even though uplink synchronization is not achieved between the first UE and the second UE. Therefore, even though the BS cannot decode the uplink data, the BS can recognize that the different UEs transmit the uplink data using the reference signals.

In the first resource, a symbol for transmitting the uplink data and a CP for the uplink data may further be disposed. The CP length of the uplink data may be set to be equal to the CP length of the random access preamble. The symbol for transmitting the uplink data may be repeatedly disposed after the CP of the uplink data. In this manner, the structure of the first resource for uplink data is set. Likewise, the CP length of the uplink data is set to be longer than a normal uplink data transmission channel, thus maximally maintaining orthogonality between the reference signals even though uplink synchronization is not achieved. Further, the symbol for transmitting the uplink data is repeated, thereby preventing the maximum bandwidth for uplink data transmission from being reduced.

The first UE receives a response signal to the uplink data. The response signal may correspond to message 4 in the random access procedure.

The response signal may include a backoff value for retransmitting the random access preamble according to the reference signal or may include allocation information on a dedicated random access preamble to the first UE. That is, since the BS cannot decode the uplink data transmitted by the first UE due to the uplink synchronization difference, the BS may transmit the backoff value for retransmitting the random access preamble via message 4 so that the first UE can repeat the random access procedure. Since the backoff value may be determined for each reference signal, the first UE may be allocated a different backoff value from that of another UE. In addition, the BS may allocate a dedicated random access preamble available only for each UE, thereby allowing a UE that is allocated a dedicated random access preamble to repeat the random access procedure.

The present invention proposes an apparatus for transmitting uplink data on the basis of a connectionless transmission procedure in a wireless communication system.

Defining terms first, a connectionless transmission procedure may correspond to a procedure in which a UE transmits data to a BS in a state where a connection between the UE and the BS is not established. The state where the connection between the UE and the BS is not established may correspond to an RRC-unconnected state, an idle state, or an inactive state. A symbol described below may correspond to an OFDM symbol.

The apparatus may be a UE. The UE may be a first UE, and another UE may be a second UE.

The apparatus includes a radio frequency (RF) unit to transmit and receive a radio signal and a processor connected to the RF unit. First, the processor transmits a random access preamble for requesting connectionless transmission. The processor receives a random access response including scheduling information on uplink data and information indicating the CP length of a reference signal for the uplink data. The processor transmits the uplink data and the reference signal via a first resource set based on the scheduling information on the uplink data and the information indicating the CP length of the reference signal. Here, the CP length of the reference signal in the first resource may be set to be equal to the CP length of the random access preamble. Further, the first resource may correspond to a resource used overlappingly by the UE and the other UE.

According to the proposed method, even when UEs transmit message 3 via the same resource, the BS may decode signals from the UEs and may notify each UE whether on message 3 is successfully decoded. Accordingly, the probability of success of connectionless transmission increases, thereby reducing the number of times a UE repeats a random access procedure due to the failure of transmission.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
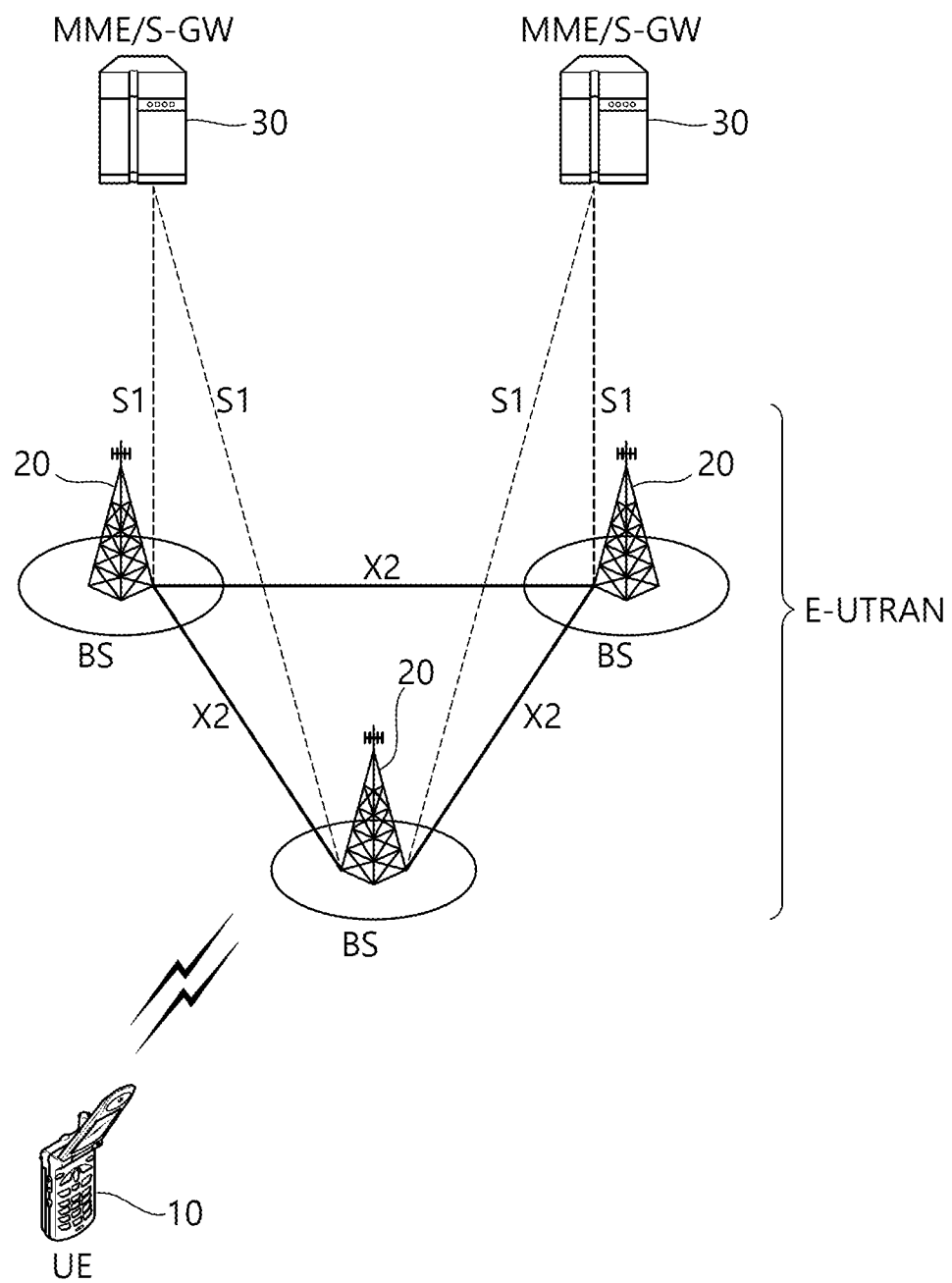
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
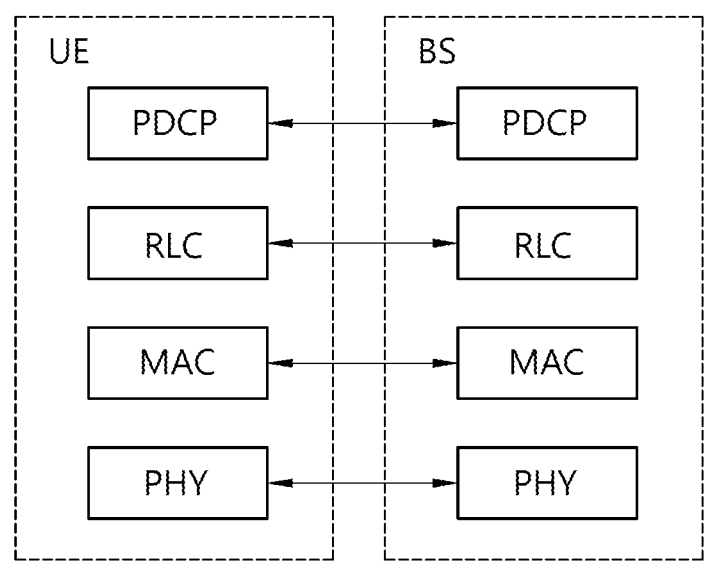
FIG. 2 is a diagram illustrating a radio protocol architecture for a user plane.
Figure 3:
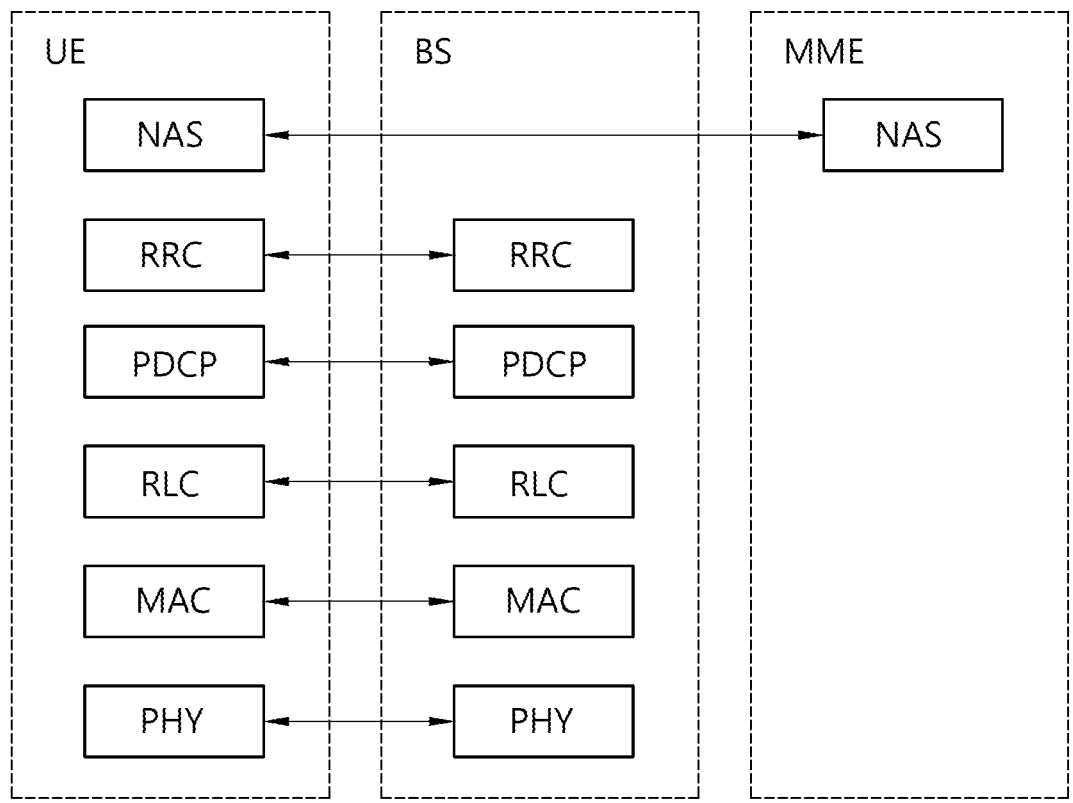
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC-connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
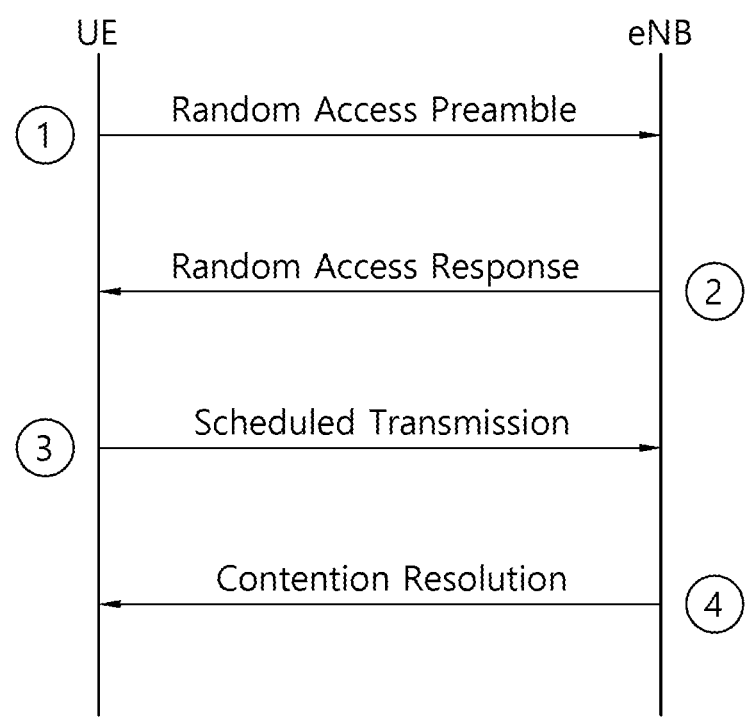
FIG. 4 shows an operation procedure between a user equipment and a base station in a contention based random access procedure.

FIG. 4 shows an operation procedure between a UE and a BS in a contention based random access procedure.

First, a UE in the contention based random access randomly may select a random access preamble within a group of random access preambles indicated through system information or a handover command, may select PRACH resources capable of transmitting the random access preamble, and then may transmit the selected random access preamble to a BS (Step 1).

After transmitting the random access preamble, the UE may attempt to receive a response with respect to its random access preamble within a random access response reception window indicated through the system information or the handover command (Step 2). More specifically, the random access response information is transmitted in a form of MAC PDU, and the MAC PDU may be transferred on the Physical Downlink Shared Channel (PDSCH). In addition, the Physical Downlink Control Channel (PDCCH) is also transferred such that the UE appropriately receives information transferred on the PDSCH. That is, the PDCCH may include information about a UE that should receive the PDSCH, frequency and time information of radio resources of the PDSCH, a transfer format of the PDSCH, and the like. Here, if the PDCCH has been successfully received, the UE may appropriately receive the random access response transmitted on the PDSCH according to information of the PDCCH. The random access response may include a random access preamble identifier (ID), an UL Grant, a temporary C-RNTI, a Time Alignment Command, and the like. Here, the random access preamble identifier is included in the random access response in order to notify UEs to which information such as the UL Grant, the temporary C-RNTI, and the Time Alignment Command would be valid (available, effective) because one random access response may include random access response information for one or more UEs. Here, the random access preamble identifier may be identical to the random access preamble selected by the UE in Step 1.

If the UE has received the random access response valid to the UE itself, the UE may process each of the information included in the random access response. That is, the UE stores the temporary C-RNTI. In addition, the UE uses the UL Grant so as to transmit data stored in a buffer of the UE or newly generated data to the BS (Step 3). Here, a UE identifier should be essentially included in the data which is included in the UL Grant (message 3). This is because, in the contention based random access procedure, the BS may not determine which UEs are performing the random access procedure, but later the UEs should be identified for contention resolution. Here, two different schemes may be provided to include the UE identifier. A first scheme is to transmit the UE's cell identifier through the UL Grant if the UE has already received a valid cell identifier allocated in a corresponding cell prior to the random access procedure. Conversely, the second scheme is to transmit the UE's unique identifier (e.g., S-TMSI or random ID) if the UE has not received a valid cell identifier prior to the random access procedure. In general, the unique identifier is longer than the cell identifier. In Step 3, if the UE has transmitted data through the UL Grant, the UE starts the contention resolution timer.

After transmitting the data with its identifier through the UL Grant included in the random access response, the UE waits for an indication (instruction) of the BS for the contention resolution. That is, the UE attempts to receive the PDCCH so as to receive a specific message (Step 4). Here, there are two schemes to receive the PDCCH. As described above, if the UE identifier transmitted via the UL Grant is the cell identifier, the UE attempts to receive the PDCCH by using its own cell identifier. If the UE identifier transmitted via the UL Grant is its unique identifier, the UE attempts to receive the PDCCH by using the temporary C-RNTI included in the random access response. Thereafter, for the former, if the PDCCH (message 4) is received through its cell identifier before the contention resolution timer is expired, the UE determines that the random access procedure has been successfully (normally) performed, thus to complete the random access procedure. For the latter, if the PDCCH is received through the temporary cell identifier before the contention resolution timer is expired, the UE checks data (message 4) transferred by the PDSCH that the PDCCH indicates. If the unique identifier of the UE is included in the data, the UE determines that the random access procedure has been successfully (normally) performed, thus to complete the random access procedure.

Hereinafter, connectionless transmission will be described.

In a 3GPP LTE system, a UE in an idle state needs to establish an RRC connection and a data connection before performing data transmission. That is, both a logical connection (RRC connection) between a BS and a UE and a logical connection (S1 connection/interface, EPS connection) between a mobility management entity (MME) and a UE need to be established.

Figure 5:
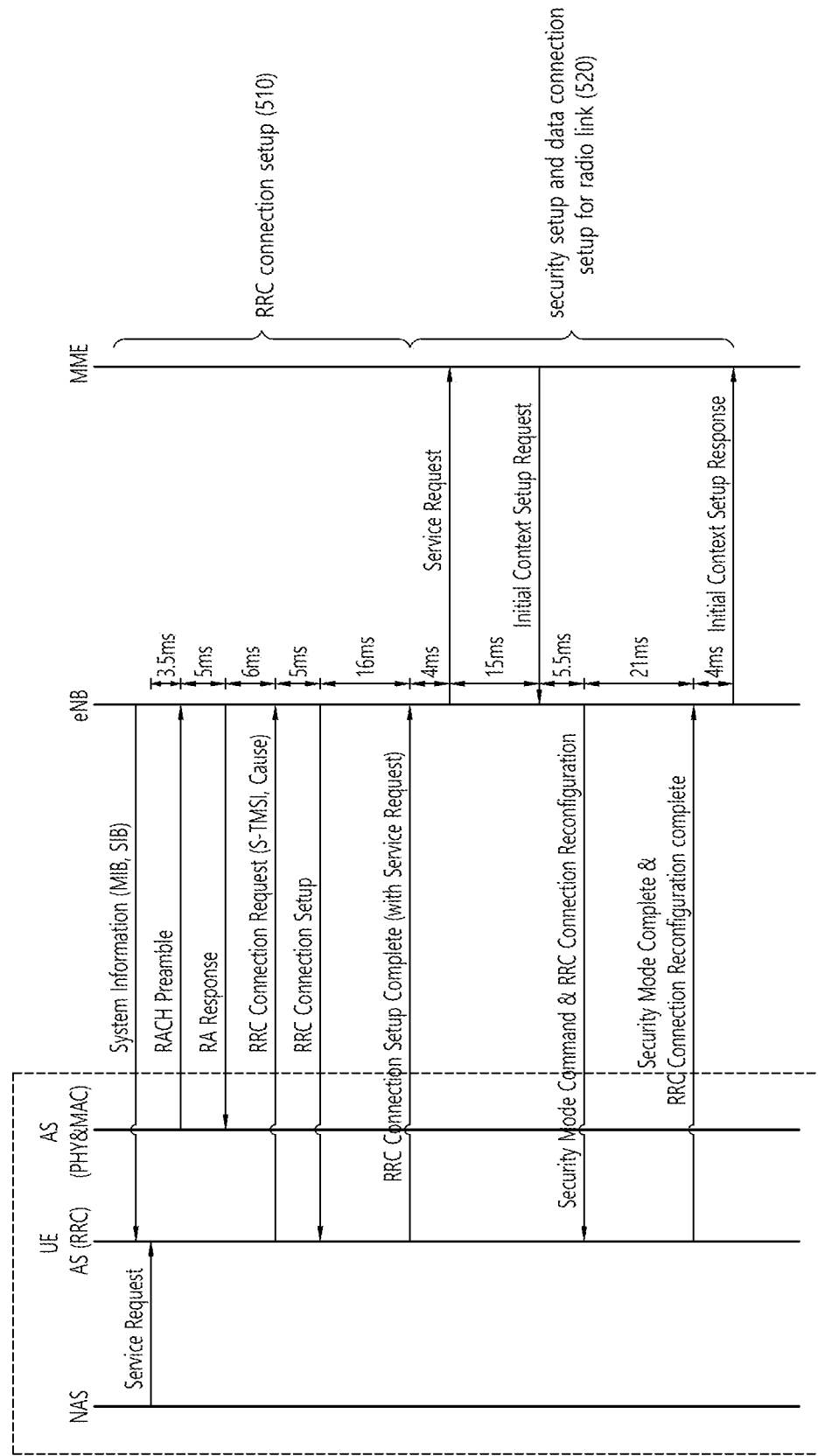
FIG. 5 shows a procedure and required time for connection setup in 3GPP LTE.

FIG. 5 shows a procedure and required time for connection setup in 3GPP LTE.

Referring to FIG. 5, a UE performs RRC connection setup 510 with a BS (eNB) before transmitting data. The UE receives system information, such as a master information block (MIB) and a system information block (SIB), from the BS. The UE transmits a random access preamble through an RACH resource and receives a random access response in response to the random access preamble. Then, the UE transmits an RRC connection request message to the BS and receives an RRC connection setup message from the BS. When the UE transmits an RRC connection setup complete message to the BS, RRC connection setup 510 may be achieved.

When RRC connection setup 510 with the BS is achieved, the UE performs security setup and data connection setup 520 for a radio link with a mobility management entity (MME). The BS makes a service request to the MME, and the MME transmits an initial context setup request to the BS. The BS transmits a security mode command and an RRC connection reconfiguration message to the UE. The UE transmits a security mode complete message and an RRC connection reconfiguration complete message to the BS. Then, the BS transmits an initial context setup request to the MME. Accordingly, the UE may achieve security setup and data connection setup 520 for the radio link with the MME.

Since a total of 35.5 ms is required for RRC connection setup 510 and a total of 49.5 ms for security setup and data connection setup 520 for the radio link, it takes 85 ms in total to switch the connection state of the UE in the idle state.

To transmit uplink data after switching the connection state of the UE, the UE needs to make a scheduling request to the BS. A procedure for transmitting uplink data and a delay caused thereby are described with reference to FIGS. 6 and 7.

Figure 6:
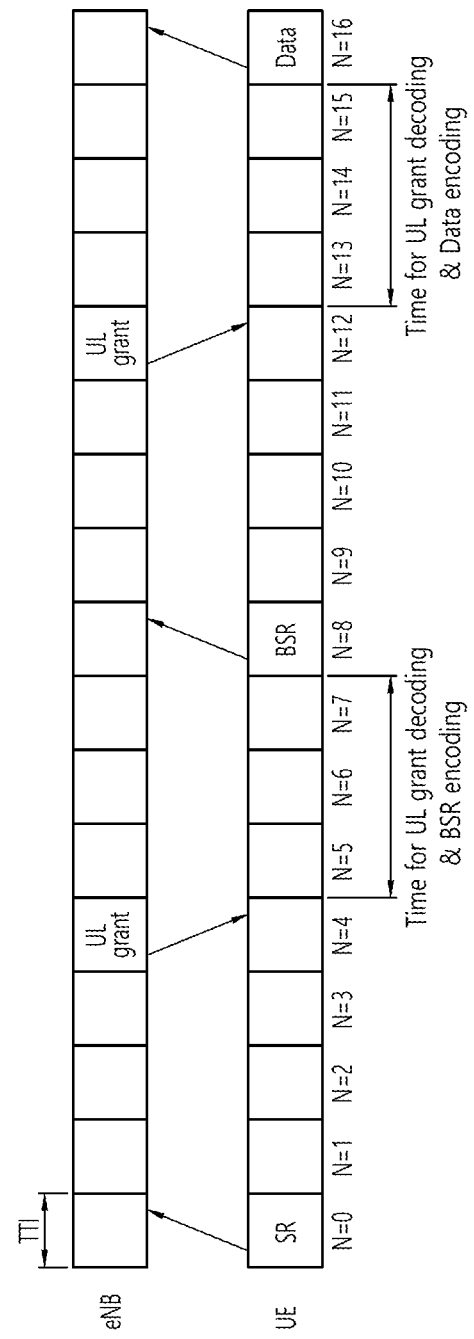
FIG. 6 shows time required for an uplink resource allocation scheme through a scheduling request in 3GPP LTE.

FIG. 6 shows time required for an uplink resource allocation scheme through a scheduling request in 3GPP LTE.

Referring to FIG. 6, a UE makes a scheduling request (SR) to a BS, and the BS transmits a UL grant to the UE. The UE decodes the UL grant and encodes a buffer status report (BSR) for a certain period of time. Then, the UE transmits the encoded BSR to the BS, the BS transmits a UL grant to the UE, and the UE transmits data to the BS according to the UL grant. This uplink resource allocation scheme through the UE's scheduling request may cause a total delay of 9.5 ms.

Figure 7:
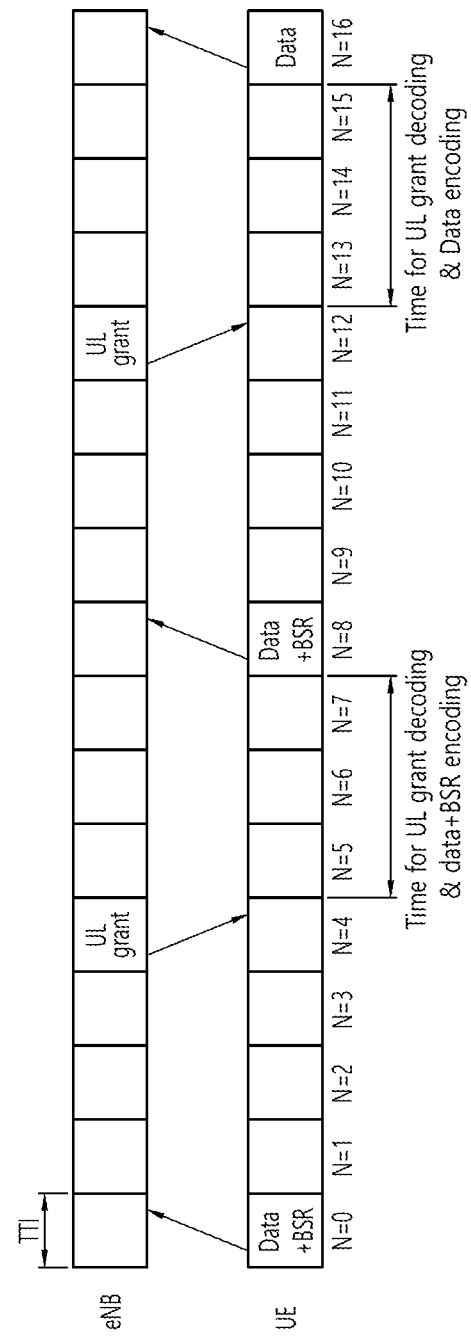
FIG. 7 shows time required for an uplink resource allocation scheme through a scheduling request and a buffer status report in 3GPP LTE.

FIG. 7 shows time required for an uplink resource allocation scheme through a scheduling request and a buffer status report in 3GPP LTE.

Referring to FIG. 7, a UE transmits data and a BSR to a BS, and the BS transmits a UL grant to the UE. The UE decodes the UL grant and encodes the data and the BSR for a certain period of time. Then, the UE transmits the encoded data and BSR to the BS, the BS transmits a UL grant to the UE, and the UE transmits data to the BS according to the UL grant. This uplink resource allocation scheme through the UE's scheduling request and BSR may cause a total delay of 17.5 ms.

That is, it may take 9.5 ms to 17.5 ms in total for a UE, which has switched to the connected state, to occupy a radio resource and to transmit data. Since it takes 85 ms in total to switch the connection state of a UE in the idle state, the total time required for the UE in the idle state to transmit data may be 94 ms to 102.5 ms. Therefore, a connectionless transmission scheme may be considered to reduce time delay caused by the connection state switch of the UE.

Generally, a UE that has no data to transmit switches to the idle state to save power or to reduce network overhead. The UE in the idle state needs to switch to the connected state in order to transmit or receive data. A connection state switch process generates a large amount of signaling between a BS and a UE. Since the UE needs to transmit a signal a plurality of times in order to process a large amount of signaling, battery consumption is increased and a delay occurs before data transmission. Thus, it is inefficient to establish a connection even when the UE transmits or receives a small amount of data once or twice. When a connectionless transmission scheme is applied, it is possible to reduce the number of signaling times for connection setup, thereby efficiently reducing a transmission delay and battery consumption.

A random access method for an existing LTE system is disadvantageous in that when a collision occurs when transmitting a random access preamble (message 1), a collision also occurs when transmitting message 3. It is important for UEs that perform connectionless transmission to reduce the number of transmissions as much as possible in order to reduce battery consumption of the UEs and a transmission delay. Therefore, the present invention proposes a connectionless transmission procedure for increasing the probability that a BS decodes message 3 even when a collision occurs in message 1.

Nokia Solutions and Networks (NSN)'s patent on an enhanced random access channel procedure is a technique in which UEs select different DMRSs according to predefined rules when transmitting message 3. When this technique is applied, different UEs, which have received the same UL grant via message 2 due to the occurrence of a collision between random access preambles in message 1, select different DMRSs when transmitting message 3, thereby increasing the probability that a BS decodes message 3.

However, this patent is designed only considering that uplink synchronization is achieved between UEs transmitting message 3 via the same resource and thus cannot be applied to connectionless transmission. Therefore, in preparation for uplink asynchronization, it is necessary to design a subframe for transmitting message 3, which is robust against uplink asynchronization.

A connectionless transmission procedure proposed in the present invention includes messages 1 to 4. Message 1 is a random access preamble that a UE transmits to a BS, and message 2 is a random access response that the BS transmits to the UE. Message 3 includes uplink data that the UE transmits to the BS using scheduling information included in message 2. Message 4 is a response signal that the BS transmits to the UE in response to the uplink data. Through the response signal of message 4, the UE can determine whether a signal transmitted by the UE via message 3 is successfully transmitted. The transmission of the signal by the UE may fail due to a poor channel state or the occurrence of a collision between different UEs.

Hereinafter, an operation for transmitting uplink data in a subframe for message 3, which is robust against uplink asynchronization, based on connectionless transmission will be described.

Figure 8:
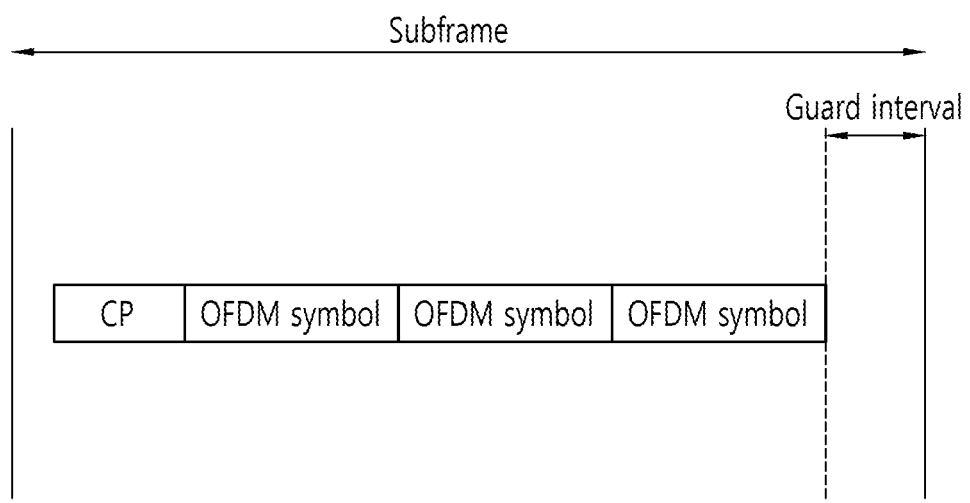
FIG. 8 shows an example of the structure of a subframe for transmitting message 3 according to an embodiment of the present invention.

FIG. 8 shows an example of the structure of a subframe for transmitting message 3 according to an embodiment of the present invention.

A UE sets the length of a cyclic prefix (CP) of an orthogonal frequency division multiplexing (OFDM) symbol for transmitting uplink data in message 3 to be longer than a normal uplink data transmission channel. For example, the UE may set a CP having the same length as a CP of a random access preamble transmitting message 1.

The UE receives time advance (TA) information for transmitting message 3 through message 2. Even though a collision occurs in message 1, a BS cannot determine the occurrence of the collision and thus transmits only one piece of TA information when transmitting message 2. Different UEs receiving the TA information via message 2 transmit message 3 using the TA information, so that the BS receives messages 3 from the different UEs with uplink asynchronization via the same resource. When an uplink synchronization difference is smaller than the CP, orthogonality between reference signals is maintained, so that the BS can easily estimate channels of the different UEs. However, when the uplink synchronization difference is greater than the CP, significant interference occurs to the reference signals, thus making accurate channel estimation difficult. Therefore, when a CP used for transmitting message 3 is set to be long, orthogonality between reference signals may be maximally maintained even when a difference in uplink synchronization occurs.

For example, the UE sets the length of the OFDM symbol for transmitting the uplink data in message 3 to be longer than the length of a normal uplink OFDM symbol. Increasing the length of the OFDM symbol generally corresponds to reducing the subcarrier spacing of the OFDM symbol. Also, setting the long OFDM symbol means that the subcarrier spacing of the resource allocated for message 3 is set to be different from the subcarrier spacing of other resources. For example, the UE may use an OFDM symbol having the same length as that of a random access preamble to transmit uplink data. Here, when a CP is set to have a long length, the overhead of the CP increases. However, when the length of the OFDM symbol is increased by an increased CP length, the CP overhead may be kept constant even if the CP length is increased.

In another example, as shown in FIG. 8, the UE disposes successive OFDM symbols after a CP set to be long in message 3 for uplink data transmission. When the subcarrier spacing of an OFDM symbol is reduced, the maximum bandwidth that can be used to transmit message 3 is also reduced. In order to solve this problem, it is possible to apply a technique of repeatedly disposing the same OFDM symbol. Data transmission rate loss caused by the repeated disposition of the OFDM symbols may be recovered by setting a high modulation and coding scheme (MCS) level for each OFDM symbol using the signal-to-noise ratio (SNR) gain due to repeated transmissions. That is, the modulation order is increased to increase a data transmission rate. FIG. 8 shows an example in which the same OFDM symbol is repeated three times.

In still another example, as shown in FIG. 8, the UE sets a guard interval (guard time) in a resource block for transmitting message 3. For example, the UE may use a guard interval having the same length as that of a guard interval of a random access preamble.

The BS transmits the TA information through message 2. However, when different UEs transmitting message 3 use the same TA information, uplink synchronization is not achieved when transmitting message 3. Therefore, a guard interval is necessary to prevent interference due to uplink asynchronization in front and rear adjacent subframes.

Figure 9:
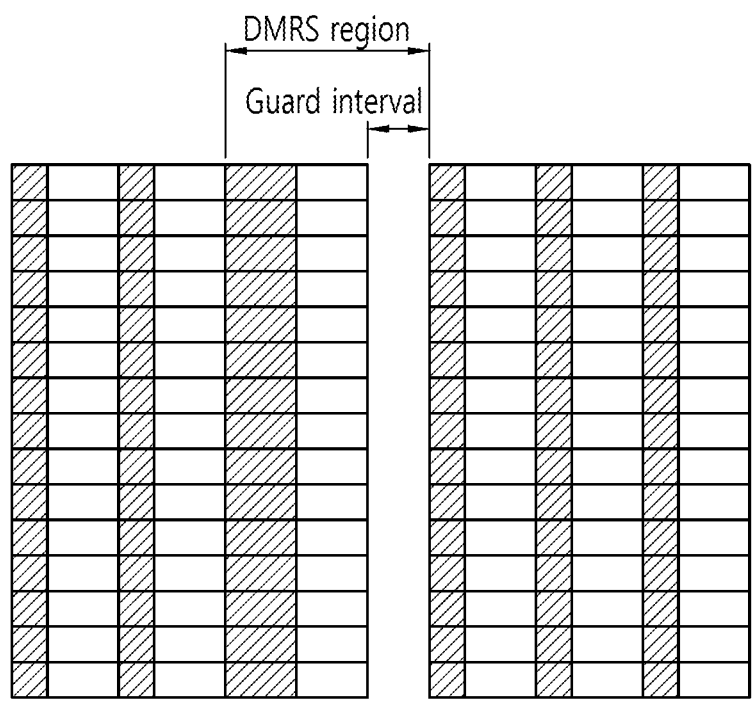
FIG. 9 shows an example of the structure of a subframe for transmitting message 3 where a CP of a reference signal is long according to an embodiment of the present invention.
Figure 10:
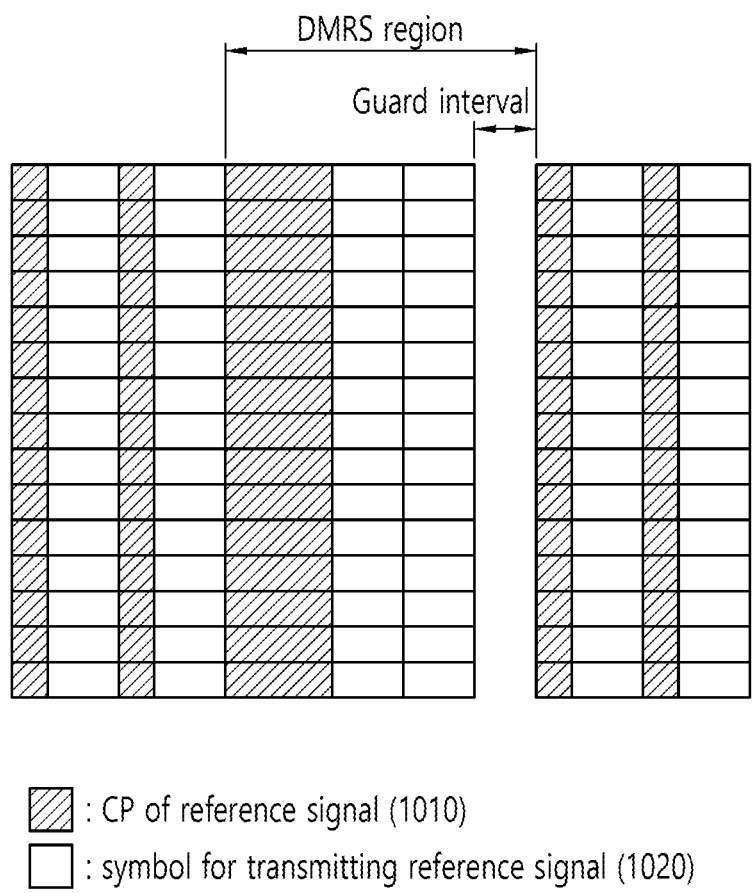
FIG. 10 shows an example of the structure of a subframe for transmitting message 3 where a reference signal is repeated according to an embodiment of the present invention.

FIG. 9 shows an example of the structure of a subframe for transmitting message 3 where a CP of a reference signal is long according to an embodiment of the present invention. FIG. 10 shows an example of the structure of a subframe for transmitting message 3 where a reference signal is repeated according to an embodiment of the present invention.

Referring to FIGS. 9 and 10, a UE sets the length of a CP 910 and 1010 of an OFDM symbol 920 and 1020 for transmitting a reference signal in message 3 to be longer than a normal uplink data transmission channel. For example, the UE may set a CP having the same length as a CP of a random access preamble transmitting message 1.

According to this scheme, orthogonality between reference signals is maintained even in uplink asynchronization, and thus the following advantage is obtained. When different UEs transmit a signal via message 3 but a BS cannot decode the signal (e.g., uplink data) due to an uplink synchronization difference, the BS can recognize using a reference signal that the different UEs have transmitted the signal. That is, the BS recognizes using a reference signal that the different UEs have transmitted message 3 to cause a collision and may perform a next step through message 4.

For example, as shown in FIG. 9, the UE sets a guard interval within a resource period for transmitting a reference signal of a message 3. For example, the UE may use a guard interval with the same length as the length of a guard interval of the random access preamble. Here, since only the reference signal is designed to be robust against uplink synchronization, it is preferable to set the guard interval immediately after the reference signal.

In another example, a BS specifies the length of a CP 910 and 1010 of a reference signal when transmitting message 2. The subframe structure of message 3 changes according to the length of the CP 910 and 1010 of the reference signal, and information on a relationship between the CP length and the subframe structure is shared in advance between the BS and the UE.

The BS receiving message 1 obtains a correlation value of the random access preamble, and there is a case where the time difference between correlation peak values exceeding a threshold value is great. In this case, since the BS can predict significant uplink asynchronization between UEs transmitting message 3, the length of the CP 910 and 1010 of the reference signal in message 3 may be set to be long.

As described above, a change in a subframe structure refers to a change in the number of symbols for transmitting data in a subframe, the length of a guard interval, the number of repetitions of a reference signal, and the like change. Here, it may be assumed that a UE uses the subframe structure of FIG. 9 when a reference signal is not repeated, and that a UE uses the subframe structure of FIG. 10 when a reference signal is repeated. When the time synchronization difference between UEs is great, the subframe structure of FIG. 10, in which a symbol 1020 for transmitting a reference signal is repeated, may be used to reliably perform channel estimation, because channel estimation for uplink data needs to precede decoding of the uplink data.

In another example, when recognizing that different UEs transmit message 3 on the same resource through a reference signal of message 3, the BS 1) assigns different backoff values for transmission of a random access preamble to the respective UEs using message 4 or 2) assigns a dedicated random access preamble to each UE using message 4. A different backoff value may be specified for each reference signal. Since uplink data needs to be retransmitted due to a collision of message 3, the BS configures message 4 as described above so that the UE can retransmit the random access preamble.

Although it is assumed in the present invention that reference signals used for transmitting message 3 are orthogonal to each other, the present invention is not limited thereto. In particular, when reference signals use the same time/frequency resource and use different code resources, the reference signals may be quasi-orthogonal to each other.

Figure 11:
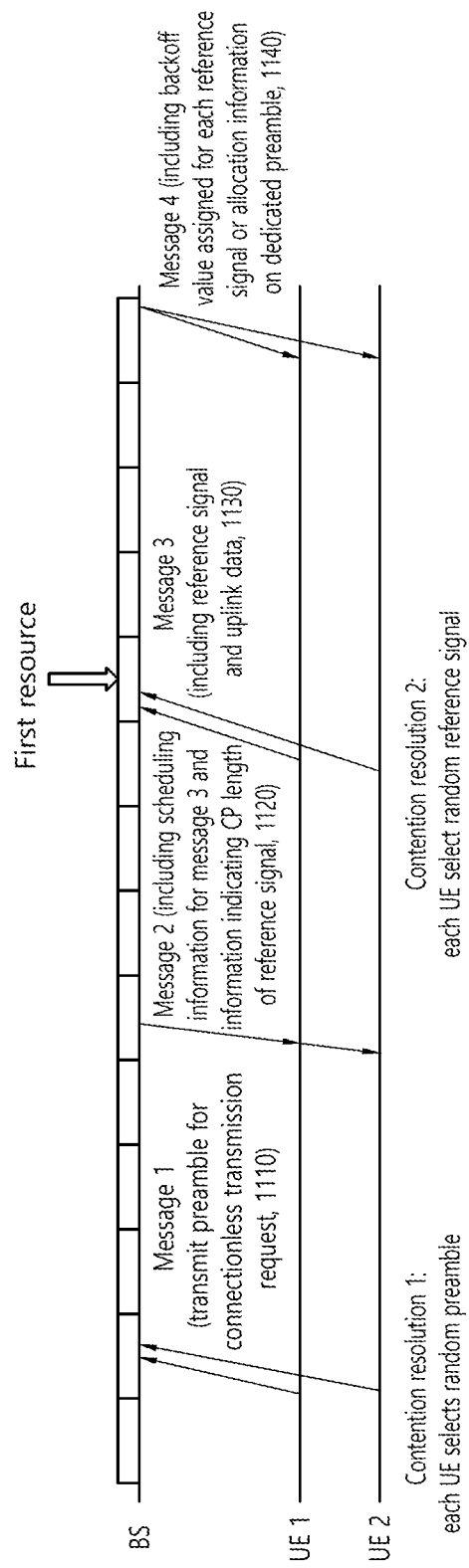
FIG. 11 shows an example of an operation performed between a UE and a BS based on connectionless transmission according to an embodiment of the present invention.

FIG. 11 shows an example of an operation performed between a UE and a BS based on connectionless transmission according to an embodiment of the present invention.

UE 1 and UE 2 transmit message 1 1110 including a preamble for a connectionless transmission request to a BS. Since each UE transmits the preamble through the same resource, a collision may occur. To resolve this collision, each UE randomly selects the preamble.

In response, the BS transmits message 2 1120 to UE 1 and UE 2 that have transmitted the preamble. Message 2 includes scheduling information on message 3 1130 and temporary identifier information. Since both UE 1 and UE 2 transmit message 3 1130 according to the scheduling information included in message 2, a collision may also occur in this case. To resolve this collision, each UE randomly selects a reference signal.

UE 1 and UE 2 transmit message 3 1130 including a reference signal and uplink data to the BS via a first resource. The first resource is set based on the scheduling information and information indicating the CP length of the reference signal.

Upon receiving message 3, the BS recognizes through the reference signals that UE 1 and UE 2, which are different UEs, have transmitted message 3 on the same first resource and thus a collision has occurred. Accordingly, the BS transmits message 4 1140 including a backoff value for transmitting a random access preamble, which is assigned for each reference signal, or a dedicated random access preamble for each UE.

Figure 12:
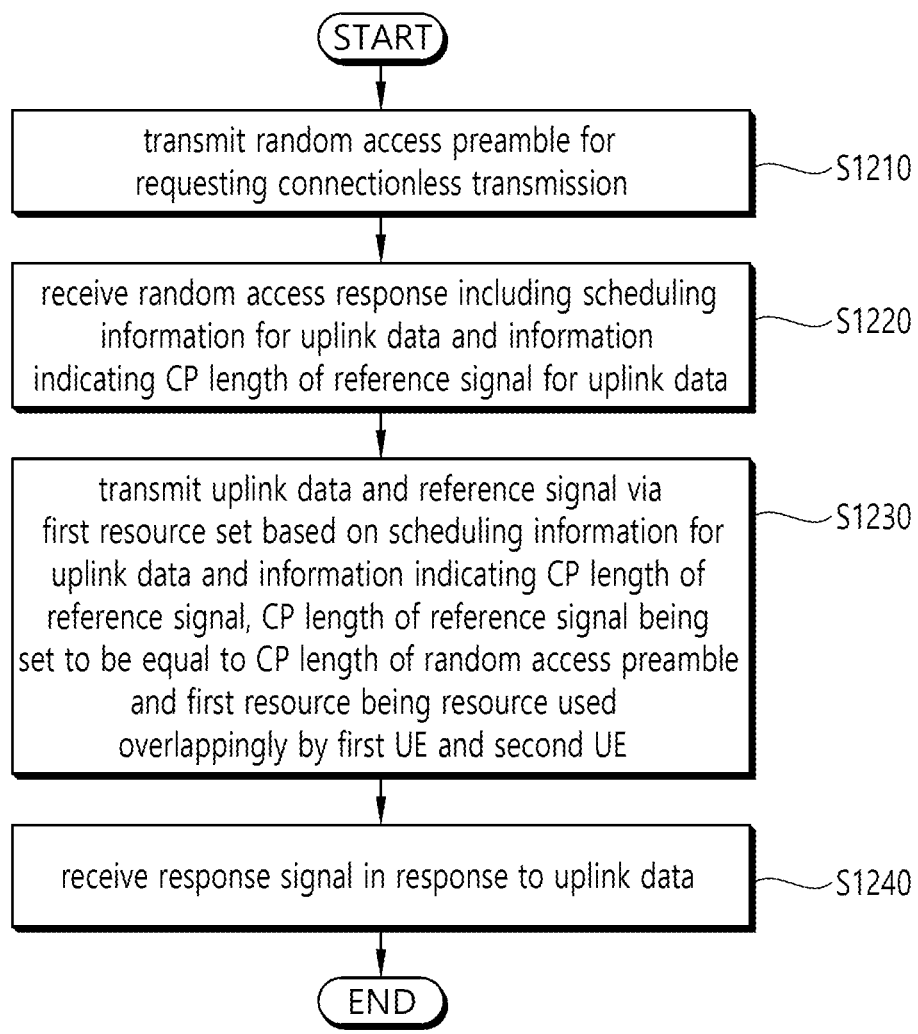
FIG. 12 is a flowchart illustrating a procedure for transmitting uplink data on the basis of connectionless transmission according to an embodiment of the present invention.

FIG. 12 is a flowchart illustrating a procedure for transmitting uplink data on the basis of connectionless transmission according to an embodiment of the present invention.

Defining terms first, a connectionless transmission procedure may correspond to a procedure in which a UE transmits data to a BS in a state where a connection between the UE and the BS is not established. The state where the connection between the UE and the BS is not established may correspond to an RRC-unconnected state, an idle state, or an inactive state. A symbol described below may correspond to an OFDM symbol.

First, in step S1210, a first UE transmits a random access preamble for requesting connectionless transmission to a BS. Here, it is assumed that the first UE and a second UE transmit a random access preamble to the BS via the same resource to perform a connectionless transmission procedure. When the same resource is a second resource, the first UE and the second UE transmit the random access preamble via the second resource. That is, the second resource may correspond to a resource used overlappingly by the first UE and the second UE to transmit the random access preamble. Also, the random access preamble may correspond to message 1 in a random access procedure.

In step S1220, the first UE receives a random access response including scheduling information on uplink data and information indicating the CP length of a reference signal for the uplink data from the BS. The information indicating the CP length of the reference signal may explicitly indicates the CP length or may indirectly indicate the CP length by reporting that a resource with a long CP length is scheduled for uplink transmission. The second UE also transmits the random access preamble and thus may also receive the same random access response including the scheduling information on the uplink data from the BS. The random access response may correspond to message 2 in the random access procedure. Here, the reference signal may correspond to a reference signal for uplink channel estimation.

When a UE requests a resource for connectionless transmission, if it is agreed in advance to apply a reference signal with a long CP length to a corresponding uplink scheduling resource, information indicating the CP length of a reference signal may be omitted.

In addition, the random access response further includes one piece of time advance (TA) information for the first UE and the second UE. When one piece of TA information is transmitted, one UE may be synchronized in time, but another UE is not synchronized in time. Here, it is assumed that, through the piece of TA information, the first UE is not synchronized in time and the second UE is synchronized in time.

In step S1230, the first UE transmits the uplink data and the reference signal via a first resource set based on the scheduling information on the uplink data and the information indicating the CP length of the reference signal. Since the first UE and the second UE receive the same scheduling information on the uplink data from the BS, the first UE and the second UE transmit uplink data via the first resource. However, each UE arbitrarily selects a reference signal for contention resolution. Here, the uplink data and the reference signal may be included in message 3 in the random access procedure.

Here, the first resource may correspond to a resource used overlappingly by the first UE and the second UE. The present invention proposes designing a resource for message 3 that is robust against uplink asynchronization so that connectionless transmission can be applied to different UEs transmitting message 3. Therefore, a method for setting or configuring the first resource is important, which will be described below.

The CP length of the reference signal in the first resource is set to be equal to the CP length of the random access preamble, which means that the CP length of the reference signal is set to be longer than a normal uplink data transmission channel. Accordingly, an uplink synchronization difference may be smaller than the CP length of the reference signal, thus maintaining orthogonality between the reference signals, and the BS can easily estimate channels for different UE.

In the first resource, a guard interval may be set after a symbol for transmitting the reference signal. The length of the guard interval may be set to be equal to the length of a guard interval of the random access preamble. The symbol for transmitting the reference signal may be repeatedly disposed after the CP of the reference signal. That is, the symbol for transmitting the reference signal may be repeatedly disposed so that the maximum bandwidth available for transmission of message 3 is not reduced.

According to the structure of the first resource, orthogonality between the reference signals may be maintained even though uplink synchronization is not achieved between the first UE and the second UE. Therefore, even though the BS cannot decode the uplink data, the BS can recognize that the different UEs transmit the uplink data using the reference signals.

In the first resource, a symbol for transmitting the uplink data and a CP for the uplink data may further be disposed. The CP length of the uplink data may be set to be equal to the CP length of the random access preamble. The symbol for transmitting the uplink data may be repeatedly disposed after the CP of the uplink data. In this manner, the structure of the first resource for uplink data is set. Likewise, the CP length of the uplink data is set to be longer than a normal uplink data transmission channel, thus maximally maintaining orthogonality between the reference signals even though uplink synchronization is not achieved. Further, the symbol for transmitting the uplink data is repeated, thereby preventing the maximum bandwidth for uplink data transmission from being reduced.

In step S1240, the first UE receives a response signal to the uplink data. The response signal may correspond to message 4 in the random access procedure.

The response signal may include a backoff value for retransmitting the random access preamble according to the reference signal or may include allocation information on a dedicated random access preamble to the first UE. That is, since the BS cannot decode the uplink data transmitted by the first UE due to the uplink synchronization difference, the BS may transmit the backoff value for retransmitting the random access preamble via message 4 so that the first UE can repeat the random access procedure. Since the backoff value may be determined for each reference signal, the first UE may be allocated a different backoff value from that of another UE. In addition, the BS may allocate a dedicated random access preamble available only for each UE, thereby allowing a UE that is allocated a dedicated random access preamble to repeat the random access procedure.

Figure 13:
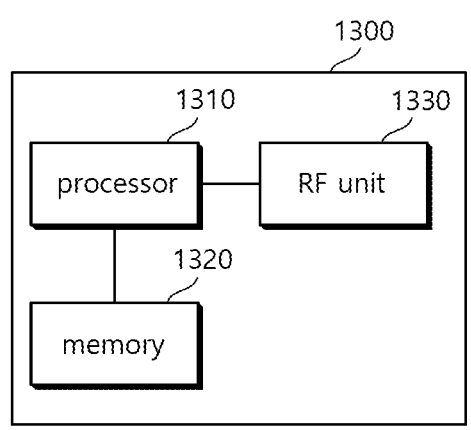
FIG. 13 is a block diagram showing an apparatus for wireless communication for implementing an embodiment of the present invention.

FIG. 13 is a block diagram showing an apparatus for wireless communication for implementing an embodiment of the present invention.

An apparatus 1300 for wireless communication includes a processor 1310, a memory 1320 and a radio frequency (RF) unit 1330.

The processor 1310 may be configured to implement proposed functions, procedures and/or methods described in this description. Layers of the radio interface protocol may be implemented in the processor 1310. The processor 1310 may handle a procedure explained above. The memory 1320 is operatively coupled with the processor 1310, and the RF unit 1330 is operatively coupled with the processor 1310.

The processor 1310 may include application-specific integrated circuit (ASIC), other chipset, logic circuit and/or data processing device. The memory 1320 may include read-only memory (ROM), random access memory (RAM), flash memory, memory card, storage medium and/or other storage device. The RF unit 1330 may include baseband circuitry to process radio frequency signals. When the embodiments are implemented in software, the techniques described herein can be implemented with modules (e.g., procedures, functions, and so on) that perform the functions described herein. The modules can be stored in memory 1320 and executed by processor 1310. The memory 1320 can be implemented within the processor 1310 or external to the processor 1310 in which case those can be communicatively coupled to the processor 1310 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for transmitting, by a first user equipment (UE), uplink data in a wireless communication system, the method comprising:

transmitting a random access preamble for requesting connectionless transmission;

receiving a random access response comprising scheduling information for uplink data and information indicating a cyclic prefix (CP) length of a reference signal; and transmitting the uplink data and the reference signal via a first resource set based on the scheduling information for the uplink data and the information indicating the CP length of the reference signal, wherein the CP length of the reference signal is set to be equal to a CP length of the random access preamble, wherein the first resource is a resource used overlappingly by the first UE and a second UE, wherein a symbol for transmitting the uplink data and a CP for the uplink data are further disposed in the first resource, wherein a CP length of the uplink data is set to be equal to the CP length of the random access preamble, and wherein the symbol for transmitting the uplink data is repeatedly disposed after a CP of the uplink data.

2. The method of claim 1, wherein a guard interval is set after a symbol for transmitting the reference signal in the first resource, and a length of the guard interval is set to be equal to a length of a guard interval of the random access preamble.

3. The method of claim 2, wherein a symbol for transmitting the reference signal is repeatedly disposed after a CP of the reference signal.

4. The method of claim 2, further comprising:

receiving a response signal to the uplink data, wherein the response signal comprises a backoff value for retransmitting the random access preamble or comprises allocation information regarding a dedicated random access preamble to the first UE, and wherein the backoff value is specified differently for each reference signal.

5. The method of claim 1, wherein the random access preamble is transmitted via a second resource that is used overlappingly by the first UE and the second UE, and the random access response further comprises one piece of time advance (TA) information for the first UE and the second UE.

6. The method of claim 1, wherein the uplink data is transmitted by the first UE and the second UE having a connection not established with a base station.

7. A user equipment (UE) configured to transmit uplink data in a wireless communication system, the UE comprising:

a radio frequency (RF) unit; and a processor connected to the RF unit, wherein the processor is configured to:

transmit a random access preamble for requesting connectionless transmission;

receive a random access response comprising scheduling information for uplink data and information indicating a cyclic prefix (CP) length of a reference signal for the uplink data; and transmit the uplink data and the reference signal via a first resource set based on the scheduling information for the uplink data and the information indicating the CP length of the reference signal, wherein the CP length of the reference signal is set to be equal to a CP length of the random access preamble, wherein the first resource is a resource used overlappingly by the UE and another UE, wherein a symbol for transmitting the uplink data and a CP for the uplink data are further disposed in the first resource, wherein a CP length of the uplink data is set to be equal to the CP length of the random access preamble, and wherein the symbol for transmitting the uplink data is repeatedly disposed after the CP of the uplink data.

8. The UE of claim 7, wherein a guard interval is set after a symbol for transmitting the reference signal in the first resource, and a length of the guard interval is set to be equal to a length of a guard interval of the random access preamble.

9. The UE of claim 8, wherein a symbol for transmitting the reference signal is repeatedly disposed after a CP of the reference signal.

10. The UE of claim 8, wherein the processor is further configured to receive a response signal to the uplink data, wherein the response signal comprises a backoff value for retransmitting the random access preamble or comprises allocation information regarding a dedicated random access preamble to the UE, and wherein the backoff value is specified differently for each reference signal.

11. The UE of claim 7, wherein the random access preamble is transmitted via a second resource that is used overlappingly by the UE and the other UE, and the random access response further comprises one piece of time advance (TA) information for the UE and the other UE.

12. The UE of claim 7, wherein the uplink data is transmitted by the UE and the other UE having a connection not established with a base station.

* * * * *